Feb. 9, 1932. S. C. FOURNET 1,844,035
TIRE CARRIER
Filed Jan. 17, 1929 2 Sheets-Sheet 2
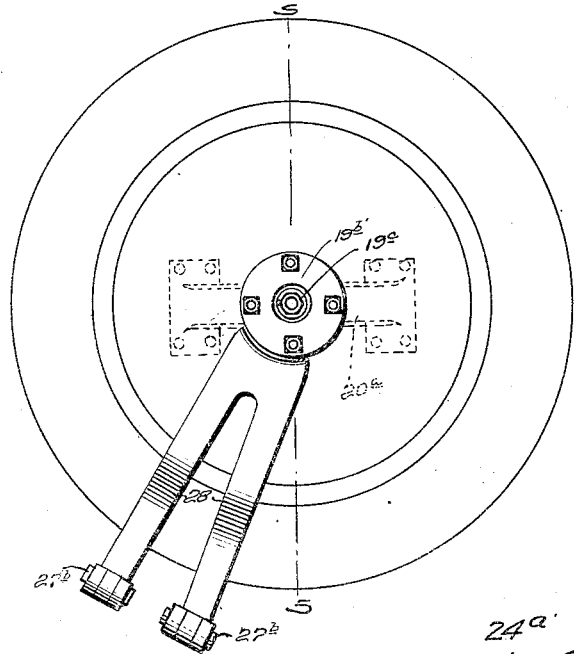
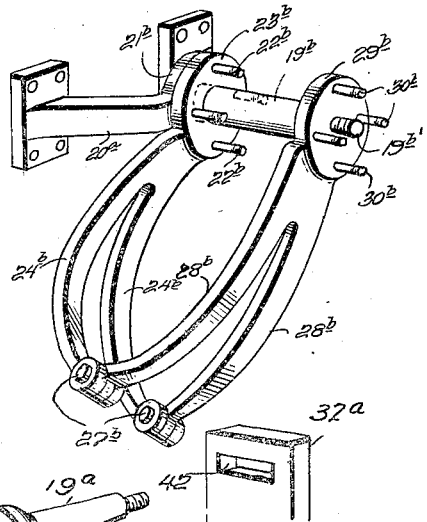
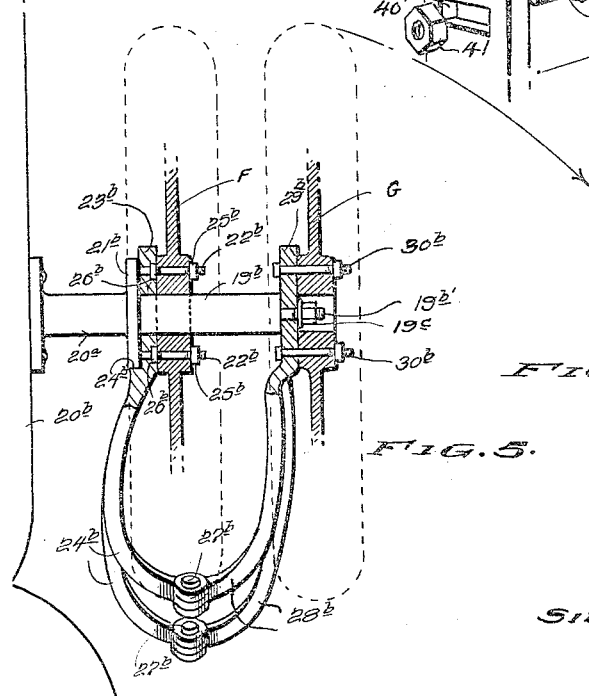
Inventor
SIDNEY C. FOURNET Patented Feb. 9, 1932

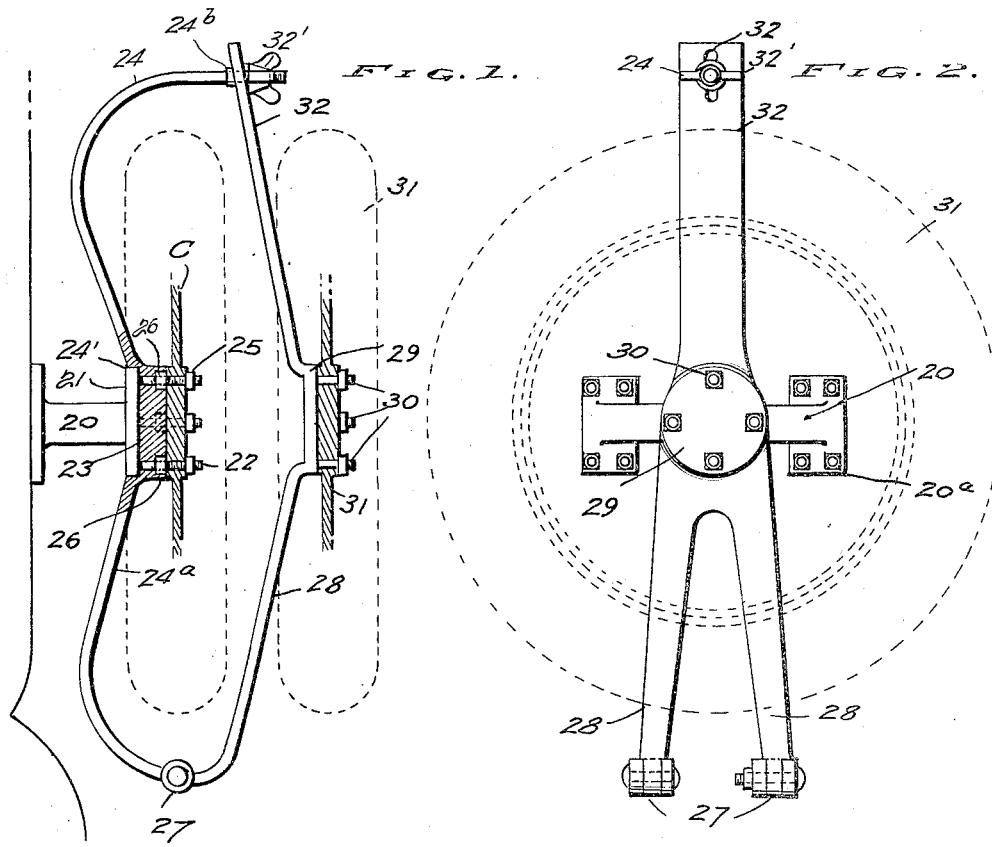
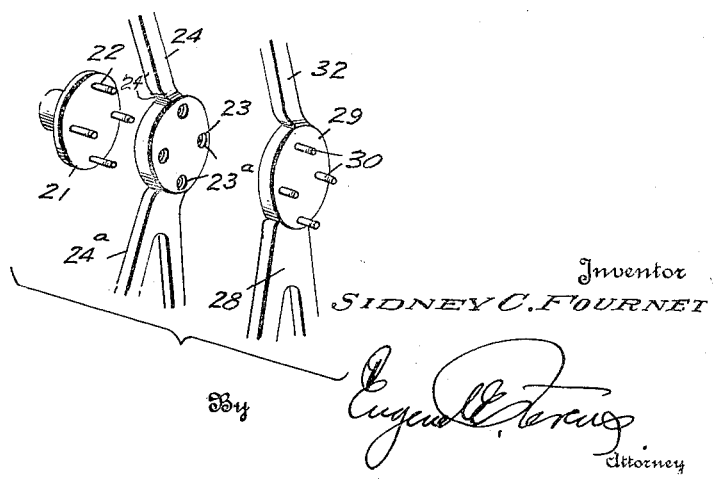

1,844,035

UNITED STATES PATENT OFFICE

SIDNEY C. FOURNET, OF NEW ORLEANS, LOUISIANA

TIRE CARRIER

Application filed January 17, 1929. Serial No. 333,182.

My invention relates to spare tire and wheel carriers for automobiles, and it has for its primary object to provide a novel and improved device of this kind whereby two or more spare tires or wheels can be carried and independently removed without the necessity of disturbing or dismounting an adjacent one.

A further object of the invention resides in the provision of novel means whereby a conventional single tire carrier can be modified, without loss of time or the exercise of unusual skill, so that it will be capable of carrying two spare wheels or tires.

A still further object of the invention resides in the provision of a duplex tire carrier comprising independent relatively swingable sections, each of which is adapted to carry a tire or wheel,—the invention being applicable for carrying disk or spoke wheels.

The invention also resides in certain novel features of construction, combination and arrangement of the various parts, and in modes of operation to be hereinafter described and claimed, reference being had to the accompanying drawings which illustrate what now appears to be forms of the invention.

It is to be understood, however, that the invention can be expressed in other modes than disclosed herein without departing from the spirit and scope of the subject matter claimed hereinafter.

In the drawings wherein the same reference characters have been employed to designate the same parts in all views, Figure 1 is a side elevational view partly broken and partly in section, illustrating one form of the invention which is especially applicable for carrying spare wheels;

Figure 2 is a front elevational view of the form of invention shown in Figure 1;

Figure 3 is a group perspective of certain parts of the device of Figures 1 and 2;

Figure 4 is a rear elevational view of a modification;

Figure 5 is a sectional view on line 5—5 of Figure 4;

Figure 6 is a perspective view of the construction of Figure 5 minus the wheels;

Figure 7 is a perspective view of a further modification; and;

Figure 8 is a group perspective view of certain elements in Figure 7.

Referring now to the form of invention shown in Figure 1, it will be seen that the disk 21 to which the hub of a spare wheel C is ordinarily secured has a pair of diverging standards 20 which are suitably attached to the body of the vehicle. The disk 21 is shaped to flatly contact the inner surface or hub portion of a disk wheel or other type of wheel and is provided with a series of bolts 22 adapted to extend through the holes of said hub whereby to secure the wheels in close contact with the plate or disk 21. A description of Figure 1 up to this point is characteristic of conventional spare wheel mounts. In order to make it possible to carry an additional spare wheel whereby the second wheel can be moved clear of the inner wheel for removal of the latter, I provide a mounting which will now be described.

This mounting comprises a disk 23, which is adapted to flatly contact with the outer face of the disk 21, said disk 23 having oppositely extending arms 24, 24$^a$. It is to be noted that these arms extend rearwardly for a slight distance so as to provide shoulders 24$^1$, to embrace the side edges of the disk 21. There is preferably but one arm 24 and this extends upwardly and forwardly, as shown. There are preferably two arms 24$^a$ which extend downwardly in forked relationship, as shown in Figure 3, their ends being curved forwardly, as indicated, for a pivotal connection 27 with a pair of corresponding arms 28 which converge to the offset disk 29.

At this point it is desired to mention that the disk 23 has holes 23$^a$ to receive the bolts 22. There are nuts 26 on the bolts 22 which are adapted to clamp the disk 23 in flat contact with the outer face of the disk 21. It is understood that the bolts extend well outwardly of the nuts 26 so as to leave plenty of stock to extend through the holes in the wheel hub or disk wheel C to receive the outer clamping nuts 25 which are, of course, removable to permit the wheel C (shown in dotted lines) to be removed.

The disk 29, previously referred to, which is carried by the arms 28 at the point of convergence thereof is provided with a plurality of transverse bolts 30 for securing the hub of a wheel 31 in flat contact with said plate or disk 29. The plate 29 has an arm 32 extending in the opposite direction from arms 28, the arm 32 having its upper end slotted, as at $32^a$, to receive the projecting end of the arm 24 of plate 23. A wing nut $32'$ serves to clamp the arm 32 against the shoulder $24^b$ of the arm 24 whereby to rigidly secure the second carrier section in upright position.

Referring to the form of invention shown in Figures 4, 5 and 6 the disk-like plate $21^b$ has diverging mounting arms $20^a$ which are secured to the body $20^b$ of the car. A wheel carrying disk $23^b$ or the plate $21^b$ or both may carry the central outwardly projecting boss member $19^b$ which is adapted to extend through the hub hole of the disk wheel F, which is secured against the face of disk $23^b$ by the bolts $22^b$ which extend from the disk $21^b$. Plate $23^b$ is rigidly secured against plate $21^b$ by means of the bolts $22^b$ having nuts $26^b$ which are counter-sunk in outer surface holes in the disk $23^b$. Nuts $25^b$ serve to clamp the hub of the wheel F against the outer face of the disk $23^b$,—these nuts, of course, being threaded upon the outer ends of the bolts $22^b$.

As in the case of Figure 1, the disk $23^b$ has the downwardly extending divergent arms $24^b$ which have their ends extending rearwardly or outwardly. At a point opposite or in a plane with wheel F each of the arms $24^b$ has a pivot connection $27^b$ with corresponding arms $28^b$ which converge in the direction of their upper ends to the disk $29^b$ with which they are integral or to which they are rigidly secured. This disk $29^b$ has a number of outwardly extending bolts $30^b$ which are adapted to extend through the holes at either side of the hub opening of the wheel G, whereby to rigidly attach said wheel against the face of said disk $29^b$. The outer end of the projection $19^b$ projects through the hub hole of the wheel G and the extremity of such projection $19^b$ is reduced and threaded, as at $19^{b'}$, for the reception of a nut $19^c$,—it being understood that the disk $29^b$ has a hole through which the projecting portion of the member $19^b$ extends. The nut $19^c$ can be operated in an obvious manner to hold the arms $28^b$ against swinging and maintain the wheels F, G in spaced parallelism.

The construction, as shown in Figure 4, provides a very neat and satisfactory construction which is considerably less expensive than the construction shown in Figure 1; in that the projection $19^b$ serves the purpose of the upwardly extending arm of the plate 23 which is shown in Figure 1.

The form of invention shown in Figure 7 is adapted particularly for application to spare wheels of the spoke variety,—that is to say wherein wire or wooden spokes are provided.

Here the mounting $20^{a'}$ is the same as shown in Figures 1 and 4 and likewise the disk $21^a$ is the same as the disk 21 of Figure 1. The arms $24^a$ and disk $23^a$ correspond to the parts 24, 23, of Figure 1, as do also the arms $28^a$, disk $29^a$, pivots $27^a$ correspond to the parts similarly numbered in Figure 1 but minus the suffix letter. However, in the form of invention shown in the modification under discussion, the arm $32^a$, which extends upwardly from the plate $29^a$ extends but a relatively short distance. Likewise the arm $24^{a'}$ which extends upwardly from the disk $23^a$ extends but a short distance. This arm $24^{a'}$ carries a forwardly projecting stud $19^a$ which is adapted to extend through the spokes of the wheel which is secured against the plate $23^a$ by the bolts $22^a$ adapted to receive nuts (not shown). The end of this member $19^a$ is threaded and adapted to be projected through a hole in the upper end of the arm or member $32^a$. A wing nut $32^{a'}$ upon such threaded end serves to bear against the outer face of the arm $29^a$ so as to hold the disks $23^a$, $29^a$,—and the wheels carried thereby,—in parallelism. Of course, the arm $32^a$ will extend rearwardly of the plane of the spokes of the wheel on disk $29^a$, and the spacing of the spokes will provide ample clearance for the manipulation of the wing nut $32^{a'}$.

It will be readily understood from the foregoing description taken in connection with the accompanying drawings that the wheels of the outer carrier sections can be readily removed, as usual, and further that the wheels of the inner carrier sections can be readily removed by simply swinging the outer carrier section aside on its pivot.

Where it is desired simply to carry tires the wheels referred to herein can be simply regarded as a part of the carrier and the tires or rather the rims and tires can be removed from the wheels and applied to the wheels already on the car without disturbing the securing elements which mount the extra wheels in place on the carriers. The foregoing point is believed to be obvious.

Frequently it may happen that spokes are in the way of stud $19^a$. Therefore, I mount the end of this stud $19^a$ in a transverse slot 40 of arm $24^{a'}$ and secure it adjustably in place by a nut 41 as shown. I also provide arm $32^a$ with a transverse slot 42 to compensate for such adjustment of $19^a$ in slot 40.

The nut $19^c$ is preferably a hex nut and operable by a socket speed wrench insertible into the hub of wheel G.

Having thus described my invention, what I claim as new and desire to secure by Letters Patent is:

1. A duplex spare wheel carrier comprising a plate having a standard secured to the vehicle frame, said plate having holes, and bolts therein for engaging the hub holes of a wheel, a second plate adapted to flatly contact with the outer face of said first plate, said second plate having holes through which said bolts extend, nuts on said bolts for binding said second plate against said first plate, the projecting portions of said bolts being adapted to engage a wheel as aforesaid to clamp the same against the base of said second plate, there being nuts on the outer ends of said bolts in addition to said aforementioned nuts, an arm extending from said second mentioned plate, the end of said arm being curved rearwardly at a point outwardly of the periphery of the wheel mounted as aforesaid, a second spare wheel carrier having an arm pivotally connected to said aforementioned arm, and latching means for holding said spare wheel carriers against relative swinging movement.

2. The combination with a spare wheel carrier having a plate for attachment to the hub of a spare wheel and securing bolts projecting from said plate; of an auxiliary tire and wheel carrying element comprising a base member adapted to flatly contact with said plate, and through which said bolts extend, means for securing said base to said plate and leaving said bolts free to engage and support a wheel against the face of said base member, an arm carried by said base member, a second plate for attachment to the hub of a second spare wheel and a pivotal connection between said arm and said second plate.

3. In a spare wheel carrier of the class described, a base member having means for attachment to the automobile body, means for clamping a spare wheel against said base member, an outward shank extending from the face of said base member and adapted to project through the hub of a wheel on said base member, an auxiliary wheel-carrying section swingably carried by said base member, said last mentioned carrying section comprising a wheel seating plate having a hole for the reception of the end of said base member projection, the end of said base member projection being threaded, and a nut adapted to be screwed upon the end of said base member projection to bear against the face of said wheel seat of said second section whereby to hold the same in a carrying position substantially parallel with said base member.

4. In a spare wheel carrier, a base member means for attachment to a motor vehicle body, a carrier plate carried by said base member and having means for attachment of a spare wheel thereto, a second wheel-carrying member, means for swingably connecting said wheel-carrying members and having a pivot point located outwardly of the peripheries of the spare wheels, and a connector shank extending from said carrier plate, said second wheel-carrying member having an opening through which said shank extends, and clamp means carried by said shank and cooperating with the outer face of said second wheel carrying member whereby to hold the two members in upright carrying position.

5. In a duplex spare wheel mount, a primary wheel-supporting plate having a vehicle carried support at one side and wheel securing bolts at the other, a second wheel-supporting plate and having wheel securing means, a mounting plate for said second wheel-supporting plate, an offset swingable supporting connection between the second wheel-supporting plate and its mounting plate, said bolts extending through and beyond said mounting plate and adapted to secure a wheel thereagainst, said bolts having one set of nuts to clamp said mounting plate against said first wheel-supporting plate and another set of nuts for clamping a wheel against said mounting plate.

6. In a duplex spare wheel mount, a primary wheel-supporting plate having a vehicle carried support at one side and wheel securing bolts at the other, a second wheel-supporting plate and having wheel securing means, a mounting plate for said second wheel-supporting plate, an offset swingable supporting connection between the second wheel-supporting plate and its mounting plate, said bolts extending through and beyond said mounting plate and adapted to secure a wheel thereagainst, said bolts having one set of nuts to clamp said mounting plate against said first wheel-supporting plate, another set of nuts for clamping a wheel against said mounting plate, an axle-like shaft extending from said primary wheel-supporting plate and through said mounting plate for supporting a wheel adjacent the latter, the end of said shaft being reduced and insertible through said second wheel carrying plate and having a shoulder forming a stop for said plate at the rear thereof, and means carried by the reduced end of said shaft at the outer surface of the second wheel-supporting plate for holding the same adjacent said shoulder.

7. A duplex spare wheel carrier comprising wheel mounts, wheel securing means carried by each mount and including studs and clamp means, a support for one of said wheel mounts and comprising relatively connected and movable sections, one of said sections of said wheel mount support being removably mountable on the studs of said other mount, and clamp means independent of the clamp means of said last mentioned mount for securing said section thereagainst.

8. A duplex spare wheel carrier comprising wheel mounts, wheel securing means carried by each mount and including studs and clamp means, a support for one of said wheel mounts and comprising relatively connected and movable sections, one of said sections of said wheel mount support being removably mountable on the studs of said other mount, and clamp means positionable on the studs of said last mentioned mount for securing said section thereagainst, said section having countersunk portions receiving its clamp means.

In testimony whereof I affix my signature.

SIDNEY C. FOURNET.